US010318968B2

(12) United States Patent
Tineo

(10) Patent No.: US 10,318,968 B2
(45) Date of Patent: Jun. 11, 2019

(54) QUEUE REDUCTION

(71) Applicant: PAYPAL, INC., San Jose, CA (US)

(72) Inventor: Brandon Tineo, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/176,044

(22) Filed: Jun. 7, 2016

(65) Prior Publication Data

US 2017/0352043 A1   Dec. 7, 2017

(51) Int. Cl.
| | |
|---|---|
| *H04W 4/021* | (2018.01) |
| *H04W 4/02* | (2018.01) |
| *H04W 4/06* | (2009.01) |
| *G01C 22/00* | (2006.01) |
| *G06Q 30/02* | (2012.01) |
| *H04W 52/02* | (2009.01) |

(52) U.S. Cl.
CPC ....... *G06Q 30/0201* (2013.01); *G01C 22/006* (2013.01); *H04W 4/021* (2013.01); *H04W 4/027* (2013.01); *H04W 4/06* (2013.01); *H04W 52/0209* (2013.01); *Y02D 70/10* (2018.01); *Y02D 70/142* (2018.01); *Y02D 70/144* (2018.01); *Y02D 70/164* (2018.01); *Y02D 70/166* (2018.01); *Y02D 70/20* (2018.01); *Y02D 70/23* (2018.01); *Y02D 70/26* (2018.01)

(58) Field of Classification Search
CPC ...... H04W 4/027; H04W 4/008; H04W 4/028
See application file for complete search history.

(56) References Cited

U.S. PATENT DOCUMENTS

| | | | | |
|---|---|---|---|---|
| 5,175,417 | A * | 12/1992 | Fujishima | G07C 11/00 235/375 |
| 2013/0151295 | A1* | 6/2013 | Denker | G06Q 10/02 705/5 |
| 2015/0088652 | A1* | 3/2015 | Finley | G06Q 30/0261 705/14.58 |
| 2015/0195680 | A1* | 7/2015 | Hsu | H04W 4/027 455/456.1 |
| 2015/0325098 | A1* | 11/2015 | Faaborg | G08B 21/18 340/573.1 |
| 2016/0192149 | A1* | 6/2016 | Zises | H04W 4/029 455/456.3 |

\* cited by examiner

*Primary Examiner* — Marisol Figueroa
(74) *Attorney, Agent, or Firm* — Haynes and Boone, LLP

(57) ABSTRACT

A system for determining queues and reducing queue times for a location determines the number of users that are in a queue based on sensor readings from a device of the users and interactions of the devices with a geofence. The system may determine the queue times based on the number of devices it determines are associated with users in a queue and a rate associated with the movement of the queue. The determined queue times may be displayed on one or more user devices that are inquiring about the location.

20 Claims, 6 Drawing Sheets

500

501
Receive Device Location Information

502
Map Location Of The Devices

503
Filter Device Locations For Devices In a Queue

504
Determine Queue Lengths

600

601
Receive Purchase Data

602
Monitor Metrics For Wait Times

603
Identify Popular Purchased Item

604
Suggest Implementing Purchase Efficiency

605
Receive Response To Suggestion

606
Implement Purchase Efficiency

QUEUE REDUCTION

TECHNICAL FIELD

The present disclosure generally relates to reducing queues, and more specifically, identifying queues through interactions between user devices and merchant devices.

BACKGROUND

When consumers go out shopping to physical establishments, consumers do not have the ability to determine how long the queues are for those physical establishments. As a result, consumers will unknowingly go to a physical establishment when it is overcrowded and end up wasting time in long lines.

Furthermore, these physical establishments may lose business by not adequately reducing the lines. Potential customers may decide not to shop at a physical establishment that seems to have an overwhelming number of patrons.

Therefore, it would be beneficial if a system were created to provide operational intelligence with regards to queue lengths for an establishment and suggested efficiency gains. It would also be beneficial if such a system were to be judicious with device resources such that the system does not overly impact battery life of user devices.

Figure 1:
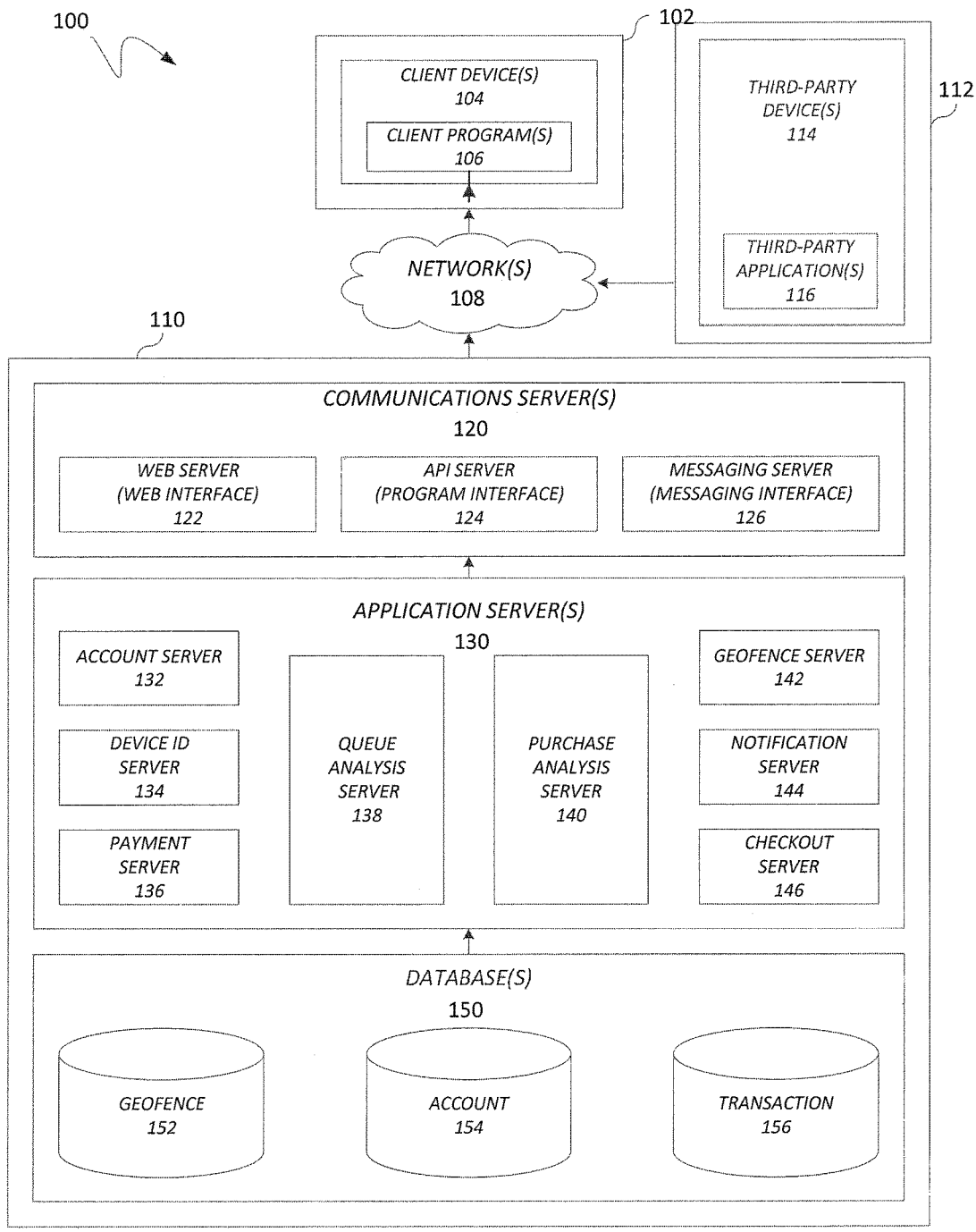
FIG. 1 is an example block diagram of a computing environment adapted for implementing a system for queue reduction.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some examples, a system for determining queue lines and queue lengths is disclosed. In some examples, the system leverages geofence capabilities of user devices to determine whether users are located at certain merchants and/or checkout stands of the certain merchants. The user devices can monitor whether it has entered, is within, or has left the area of a geofence. Furthermore, the system predicts whether the user is waiting in line based on readings from a movement sensor of the user device. For example, if a user device provides pedometer or accelerometer readings that are indicative of someone waiting in line, the system uses that information as an indication that the user is waiting in line. However, the system gathers additional information from the user devices or merchant devices to ensure that the users are waiting in a line—there are other situations where the user devices may provide movement readings similar to waiting in line. In some example, the additional information is determining that the user device is within a geofence associated with a checkout stand. In some examples, the system determines the location of the user devices and clusters the user device locations. The system then determines which clusters form a line type pattern. In some examples, based on the clusters, the system determines the length of a queue. The system may also gather other information, such as a checkout frequency associated with a merchant, to determine an estimated queue time. The queue lengths and queue times may be advertised to users inquiring about the merchant. Furthermore, the system may identify one or more possible ways for increasing the efficiency of the queues. The system may suggest or implement the identified ways of increasing the efficiency of the queues.

In some examples, a system includes a non-transitory memory storing instructions and one or more hardware processors coupled to the non-transitory memory and configured to read the instructions from the non-transitory memory to cause the system to perform one or more operations. The operation may include determining, based on location information received from a user device that the user device is interacting with at least one geofence for a location. The operations may also include determining a queue time for the location based at least in part on step counter information received from the user device. The operations may further include causing a second user device to display a graphic representative of the queue time for the location in response to receiving, from the second user device, an inquiry about the location.

In some examples, a system includes a non-transitory memory storing instructions and one or more hardware processors coupled to the non-transitory memory and configured to read the instructions from the non-transitory memory to cause the system to perform one or more operations. In some examples, the operations may include receiving pedometer readings from a plurality of devices within a geofence associated with a merchant. The operation may also include determining a subset of devices from the plurality of devices are associated with a queue is based at least in part on the pedometer readings. The operations may further include determining a queue time based at least in part on a number devices in the subset of devices.

In some examples, a system includes a non-transitory memory storing instructions and one or more hardware processors coupled to the non-transitory memory and configured to read the instructions from the non-transitory memory to cause the system to perform one or more operations. The operations may include receiving motion sensor readings from a plurality of user devices. The operation may also include receiving geofence indications that the plurality of user devices are within a geofence. In some examples, the operations may include determining based on the motion sensor readings and the geofence indications that the users of the plurality of user devices are waiting in a queue. The operations may further include determining, at least in part on the number of devices in the plurality of devices, an estimated queue time.

FIG. 1 illustrates, in block diagram format, an example embodiment of a computing environment adapted for implementing a system for queue reduction. As shown, a computing environment 100 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Some example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing environment 100 deployed in a client-server operating relationship, it is to be understood that other suitable operating environments, relationships, and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing environment 100 may include, among other elements, a third party 112, which may comprise or employ third-party devices 114 hosting third-party applications 116. In various implementations, third-party devices 114 and/or third-party applications 116 may host applications associated with or employed by a third party 112. For example, third-party devices 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party devices 114 and/or third-party applications 116 may also provide system 110 and/or client 102 with other information and/or services, such as email services and/or information, property transfer and/or handling, purchase services and/or information, and/or other online services and/or information.

In one embodiment, third-party devices 114 may include one or more servers, such as a transaction server that manages and archives transactions. In some embodiments, the third-party devices may include a purchase database that can provide information regarding purchases of different items and/or products. In yet another embodiment, third-party severs 114 may include one or more servers for aggregating consumer data, purchase data, and other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, merchant identification services, merchant information services, purchasing services, monetary transfers, checkout processing, data gathering, data analysis, and other services to users that access network-based system 110. In various embodiments, client devices 104 and/or third-party devices 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party devices 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients including, but not limited to, data analysis, geofence management, order processing, checkout processing, and/or the like. Application server 130 of network-based system 110 may provide services to a third party merchants such as real time consumer metric visualizations, real time purchase information, and/or the like. Application servers 130 may include an account server 132, device identification server 134, payment server 136, queue analysis server 138, purchase analysis server 140, geofence server 142, notification server 144, and/or checkout server 146. These servers, which may be in addition to other servers, may be structured and arranged to configure the system for monitoring queues and identifying ways for reducing queue times.

Application servers 130, in turn, may be coupled to and capable of accessing one or more databases 150 including a geofence database 152, an account database 154, transaction database 156, and/or the like. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
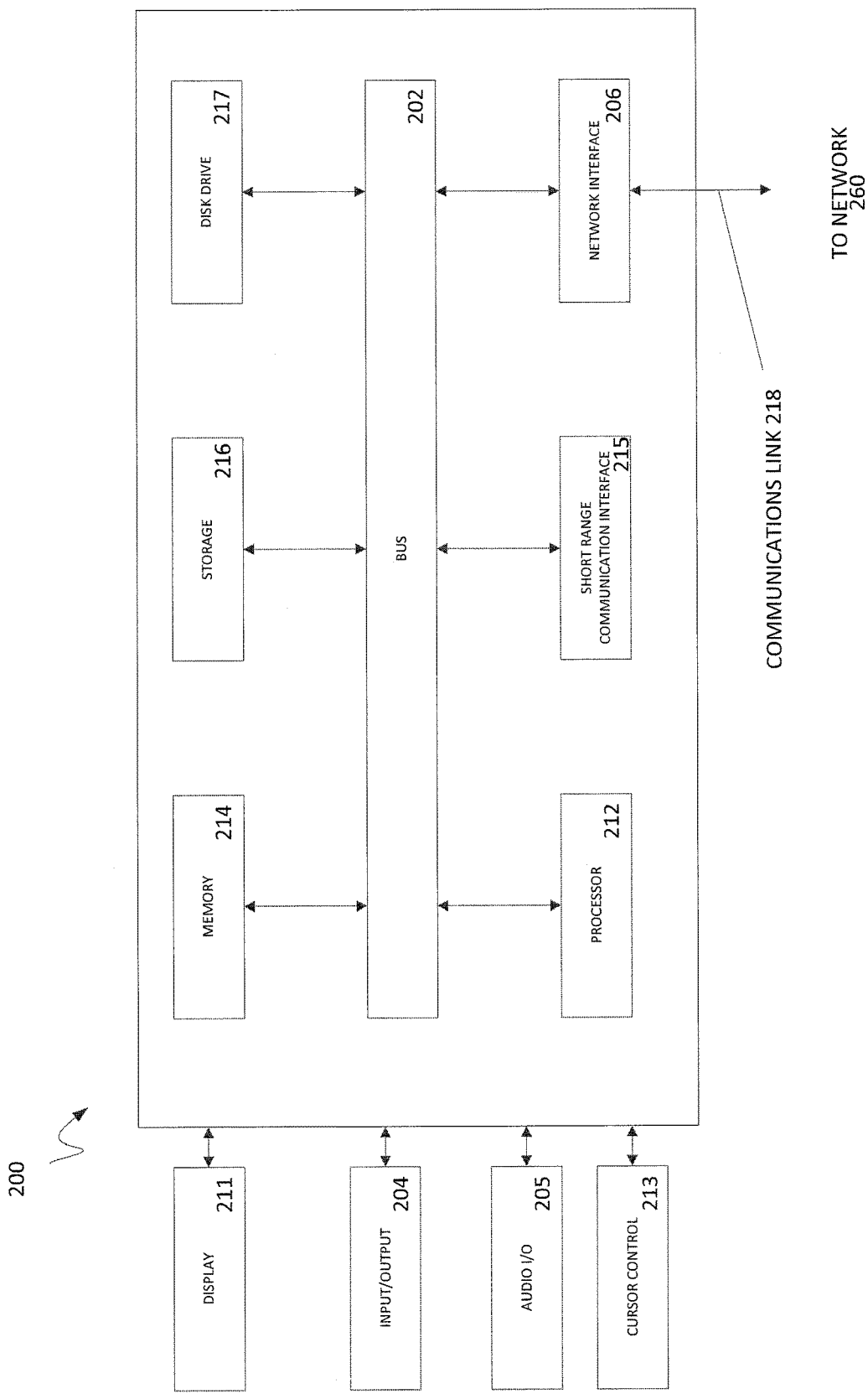
FIG. 2 is an example block diagram of a computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

Components of computer system 200 may also include a short range communications interface 215. Short range communications interface 215, in various embodiments, may include transceiver circuitry, an antenna, and/or waveguide. Short range communications interface 215 may use one or more short-range wireless communication technologies, protocols, and/or standards (e.g., WiFi, Bluetooth, Bluetooth low energy, infrared, NFC, etc.).

Short range communications interface 215, in various embodiments, may be configured to detect other devices with short range communications technology near computer system 200. Short range communications interface 215 may create a communication area for detecting other devices with short range communication capabilities. When other devices with short range communications capabilities are placed in the communication area of short range communications interface 215, short range communications interface 215 may detect the other devices and exchange data with the other devices. Short range communications interface 215 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 215 may identify a local area network using a short range communications protocol, such as WiFi, and join the local area network. In some examples, computer system 200 may discover and/or communicate with other devices that are a part of the local area network using short range communications interface 215. In some embodiments, short range communications interface 215 may further exchange data and information with the other devices that are communicatively coupled with short range communications interface 215.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
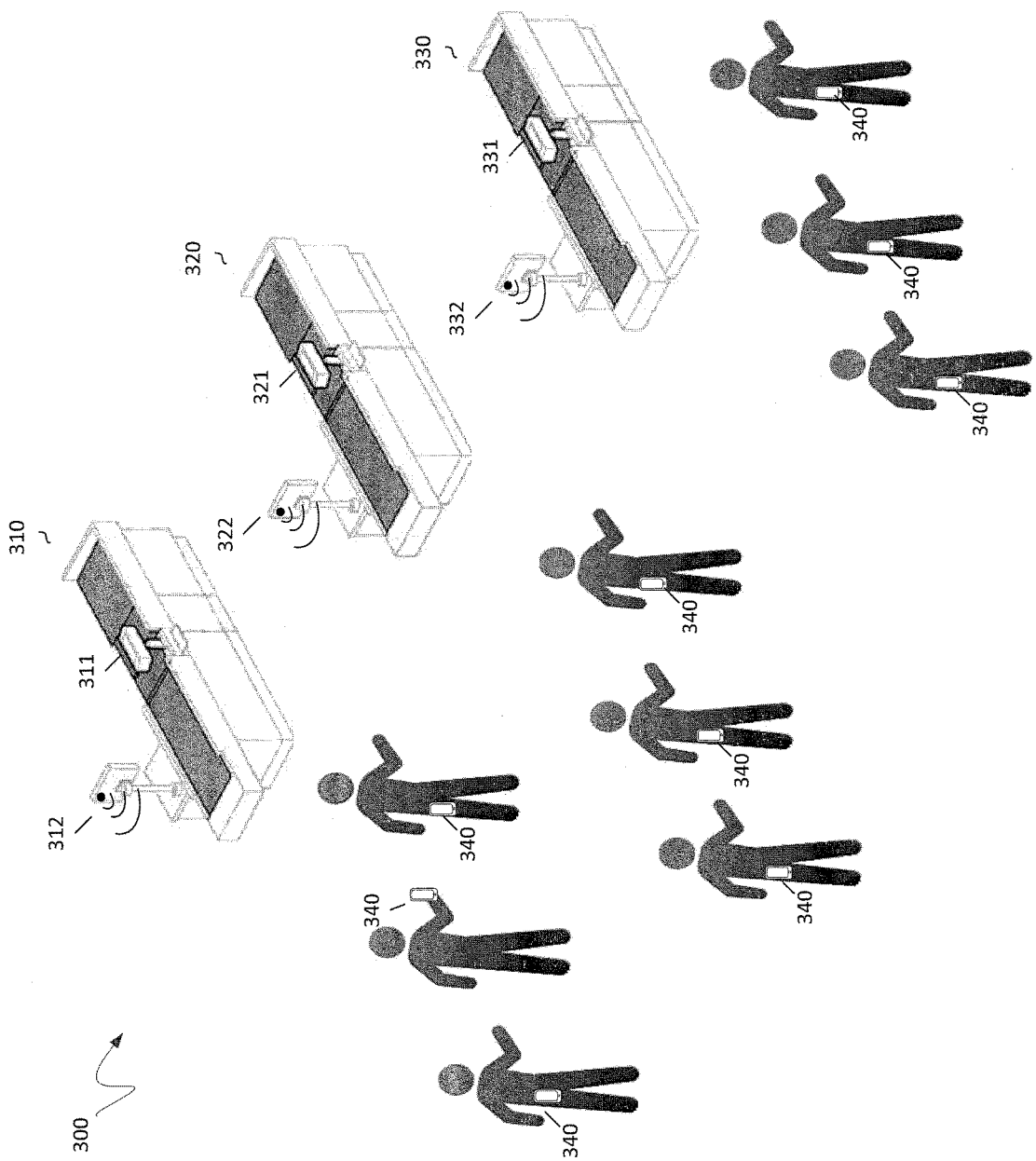
FIG. 3 illustrates an example merchant side implementation of a queue reduction system 300 for checkout stands of a grocery store.

FIG. 3 illustrates an example merchant side implementation of a queue reduction system 300 for checkout stands of a grocery store. This example is shown for illustration purposes only and it is contemplated that the system could be adapted for other stores and situations, for example, a coffee shop, pharmacy, emergency room, and/or any other situation with queues.

As shown, queue reduction system 300 may include checkout stands 310, 320, and 330. Checkout stands 310, 320, and 330 may include point of sales systems 311, 321, and 333 respectively. In some examples, point of sales (POS) systems 311, 321, and 333 may be a computing system such as computing system 200 of FIG. 2. POS systems 311, 321, and 333 may be configured to interface with user devices, such as client devices 340, for authenticating and conducting payments for goods and/or services. POS systems 311, 321, and 333 may include a card reading device that may be capable of reading magnetic strips, chips for EMV cards, and/or the like.

Furthermore, checkout stands 310, 320, and 330 may each include a wireless communicator 312, 322, and 332 respectively. Wireless communicators 312, 322, and 332 may communicate over one or more wireless protocols such as Bluetooth®, Bluetooth low Energy®, WiFi, NFC, Wireless LAN, NFC, and/or the like. Although wireless communicators 312, 322, and 332 are shown as separate from POS systems 311, 321, and 333, in other examples wireless communicators 312, 322, and 332 may be arranged in different matters, such as being integrated with POS systems 311, 321, and 333.

In some examples wireless communicators 312, 322, and 332 may be configured to communicate with one or more client devices, such as client devices 340. Client devices 340 may be a smart device or a portable computing device capable of wireless communications such as a smart phone, smart watch, fitness band, and/or the like.

In some examples, wireless communicators 312, 322, and 332 may be unidirectional wireless communicators, such as a unidirectional transmitter or a unidirectional receiver. For example, wireless communicators 312, 322, and 332 may be unidirectional transmitters configured as beacons that transmit data to client devices 340. Client devices 340 may be configured through an application to receive the data transmitted by wireless communicators 312, 322, and/or 332. In some examples, direct communications between client devices 340 and wireless communicators 312, 322, and 332 may be unidirectional, but communications between the devices relayed through a remote server may be bidirectional.

In some examples wireless communicators 312, 322, and 332 may be range limited such that communication with the communicators may be within a predefined distance and/or area. In such an example, the range limit may serve as a geofence.

In some examples, wireless communicators 312, 322, and 332 may be unidirectional receivers configured to receive information from client devices 340. Client devices 340 may be configured to broadcast a signal for wireless communicators 312, 322, and 332 to receive. In some examples, the broadcasted signal from client devices 340 may include unique identifiers identifying the device and/or user. The broadcasted signal may include information for communicatively coupling with the client device. In some examples, instead of the user devices broadcasting the signal, a wireless communicator may broadcast the signal, and client devices 340 may listen for the broadcasted signal. Client devices 340 may relay the receive information from the broadcasted signal to a remote server for use in determining queue sizes and times.

In some examples, wireless communicators 312, 322, and 332 may implement a directional antenna to shape the directivity and/or the area covered by the wireless communicators. In this manner, the wireless communicators may be focused towards and/or communicatively cover the customer line associated with the checkout stand that the wireless communicator belongs to. In some examples, the wireless communicators may use omnidirectional antennas and adjust coverage by changing the gain on the wireless signals.

In some examples, the wireless communicators may use antenna arrays with adjustable directivity through constructive and/or destructive interference. In some examples the wireless communicators may be configured to change directionality based on a determined location of a queue associated with the checkout counter of the wireless communicators. In some examples, the wireless communicators may function as detectors to detect the location of one or more devices 340 and determine the location of one or more devices 340. The benefit of a directional antenna is the capability to better determine the location of a user device based on the signal strength. With an omnidirectional antenna, a system can determine the distance from the antenna, leaving a circle of possibilities of where the user device is located. In contrast, a directional antenna can determine the distance in which a device is from the antenna based on the free space loss and signal strength, but additionally narrow the location of the device to the direction of the directionality of the antenna. Furthermore, with an antenna array that is capable of configuring the antenna directionality, the antenna can be used to sweep an area to find the location of multiple user devices accurately.

In some examples, the wireless communicators may receive location information associated with one or more devices 340, such as GPS coordinates. In some examples, a server, such as the one or more servers of network-based system 110 of FIG. 1, may control the wireless communicators. The server may control the directionality of the wireless communicators based on location information received from one or more devices 340. For example, one or more devices 340 may have an application installed that causes one or more devices 340 to communicate GPS location coordinates to the server. The server may use the received GPS coordinates to determine how to efficiently direct the antennas of the wireless communicators.

For example, based on the determined locations of one or more user devices 340, the antennas of wireless communicators 312, 322, and 332 may be configured to have a directionality profile covering a customer line associated with the respective checkout stand (e.g. checkout stands 310, 320, and 330). In some examples, such as when the system detects multiple queues that may be associated with a checkout stand, the antennas of the wireless communicators may be directed to a particular queue that is determined associated with the wireless communicator or respective checkout stand. In some examples, determining which checkout stand is associated with a particular queue may depend on one or more factors. The factors may include the distance between one of the queues or a user device associated with one of the queues and the location of the communicator (or other related objects such as the checkout stand, point of sales system, a sale person, a devices of a sales person, and/or the like), trajectory of the lines, whether the lines are to the right or left of the location of the communicator, how devices change distances over time in relation to the communicator, what POS device the user device interacts with, and/or the like. For example, the system may monitor the location of one or more user devices 340 over a period of time. The system may associated each of the one or more user devices with a queue. Over time, one of the one or more user devices will move much closer to the checkout stand associated with the queue as the user conducts a purchase. Based on one of the devices in the queue moving closer to a particular checkout stand, the system may associate the queue associated with that device with that particular checkout stand. In other examples, the queue may be associated with the checkout stand that one of the user devices of the queue interacts with. For example, if a member of the queue conducts a payment using POS system 321, the system may determine that the associated queue is associated with checkout stand 320. How user devices are associated with queues are discussed in more detail below.

By determining the location of each line associated with the checkout stands and having the antennas of the wireless communicators be directed towards the associated lines, the wireless communicators can use its wireless energy efficiently. Furthermore, determining the location of each line and the queue size for each line can be used to help consumers determine which checkout stand to go to.

In some examples, client devices 340 may be configured to implement one or more battery life saving techniques such that integrating with the queue reduction system does not drain the battery of client devices 340. Attempting to communicate with wireless communicators 312, 322, and/or 332 is a battery intensive activity, and therefore, reducing unnecessary wireless communication attempts would be beneficial. In some examples, client devices 340 may be configured to attempt to communicate with wireless communicators 312, 322, and/or 332 in response to one or more conditions. For example, one condition may be for client devices 340 to determine that it is within one or more geofences. Another condition maybe for client devices 340 to determine the user is standing in line. In some examples, client devices 340 may determine whether the user is standing in a line based on pedometer step count patterns, step frequencies, movement frequencies, and/or the like. For examples, client devices 340 may include one or more sensors, such as an accelerometer, gyroscope, and/or the like, that can be used in conjunction with an application to determine whether the user is taking a step, moving, and/or has a particular movement/step frequency. Client devices 340 may be configured to determine whether the user is standing in a line or not based on the step and/or movement determinations. In some examples, the condition may be that the user device not detect a step or movement for a threshold period of time. As discussed above, detecting and/or sending wireless communication signals consumes a lot of battery power, and therefore, implementing one or more of these conditions may improve the battery life of client devices 340 when implementing one or more applications associated with queue reduction system 300.

Figure 4:
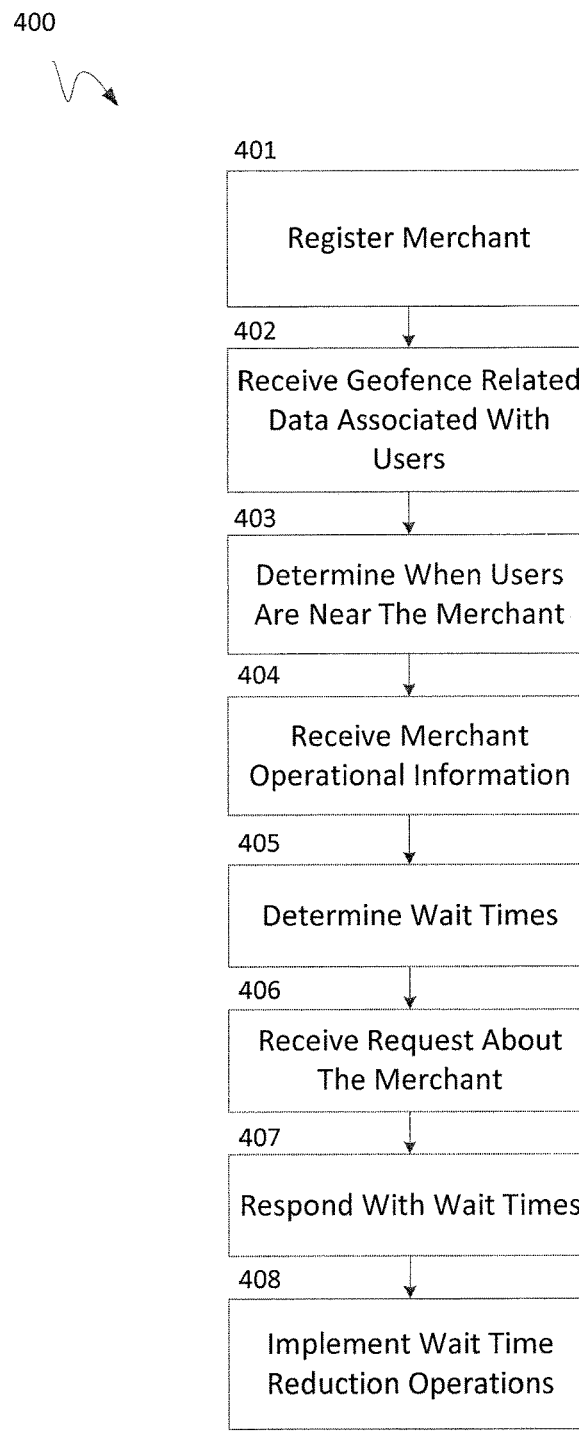
FIG. 4 is a flow diagram illustrating an example process for queue management.

FIG. 4 illustrates example process 400 for queue management that may be implemented by a system such as computing environment 100 of FIG. 1 and/or queue reduction system 300 of FIG. 3. According to some embodiments, process 400 may include one or more of operations 401-408, which may be implemented, at least in part, in the form of executable code stored on a non-transitory, tangible, machine readable media that, when run on one or more hardware processors, may cause a system to perform one or more of the operations 401-408.

In some examples, process 400 may include operation 401. At operation 401 the system may register a merchant. Registering a merchant may comprise receiving information about the merchant. In some cases, the information received may include an address, geographical location, one or more geo-fences encompassing at least part of the physical boundaries of the merchant, one or more geo-fences associated with checkout stands, device identifiers for point of sales systems, and/or the like. In some examples, the system may receive information regarding where checkout stands are located, what devices are associated with each checkout stand, and/or other information.

In some examples, registering a merchant may include registering, authenticating, and/or establishing a communication with one or more merchant devices. In some examples, the one or more merchant devices may be one or more devices that make up part of a checkout stand. For example, the system may register devices such as POS system 311 of FIG. 3 and/or communication device 312.

The system may receive identifiers and/or communication addresses for the one or more merchant devices, such as login information, merchant identification information, serial numbers, media access controller (MAC) address, Internet protocol (IP) addresses, and/or the like. The system may use this information to authenticate and differentiate the merchant devices from other merchant devices and/or unauthorized devices. This information may also be used for associating a database partition, data log, memory locations, and/or the like associated with the merchant.

In some examples, process 400 may include operation 402. At operation 402, the system may receive geofence related data associated with one or more users. The geofence related data may be from one or more user devices associated with the one or more users. Some example user devices may include, smart watches, smart phones, fitness trackers, and/or the like. In some examples, geofence related data may be location data for a geographical positioning system (GPS). In some examples, the user devices may have one or more applications installed on the device configured to communicate with the system through an API. In some examples, geofence related data may be interactions with one or more communication devices, such as wireless communicators 312, 322, and 332 of FIG. 3.

In some examples, the user device may be configured by an application associated with the system to determine when the device enters, exits, or is within one or more geofences associated with the system. In some examples, the device and/or system may leverage a third-party geofence service using an API to determine whether a user device has entered, dwelled, or left a geofence area. The device may forward some or all of the information about its interaction with a geofence to the system. For example, the device may indicate to the system which geofence the device has entered, exited, or is dwelling in. In some examples, the geofence may be based on the communication range of one or more devices, such as wireless communicators 312, 322, and 332 of FIG. 3. The system may determine that the device has entered a geofence when the device relays or indicates that it is in within communication range with a device, such as wireless communicators 312, 322, and/or 332 of FIG. 3.

In some examples, process 400 may include operation 403. At operation 403, the system may determine when users are near the registered merchant of operation 401. In some examples, the system may determine which users are near the registered merchant from the information received at operation 402. In some examples, such as when the information received at operation 402 is based on interactions with a third party geofencing service, the information received at operation 402 will include information such as identifiers for a geofence and/or a merchant associated with the geofence, the particular interaction with the geofence (e.g. enter, leave, dwell, etc.), location information, and/or the like. In such an example, the system may match the identifiers to determine which merchant the user is near and/or which geofence the user interacted with. In some examples, the identifiers may be a location, and the system may determine the merchant based on the location.

In some examples, the system may monitor the location data received from the user device to determine if/when the user device enters, exits, or is within a geofence based on the received location data and the geofence received from the merchant at operation 401. In some examples, such as when the data received is GPS location information (e.g. longitude, latitude, elevation, etc.), the system may determine whether the GPS location is within the geofence or within a predetermined distance of the geofence associated with the merchant.

In some examples, the system may monitor communication information relayed by a merchant system or user device. The merchant system may implement a geofence based on the wireless communication range of a device, and the system may determine whether a user device has entered and/or left a geofence based on information indicating whether the user device and merchant device are in communication distance. For example, a merchant device may pair with the user device and the merchant device may provide the system with an identifier of the user device that it paired with. Similarly, the user device may receive a communication from the merchant device and relay information about the merchant device and the communications with the system. In this manner the system can determine which user devices, and therefore the user, is near which merchant.

In some examples, process 400 may include operation 404. At operation 404, the system may receive operational information from the merchant. Operational information may include purchase information, receipts, purchase volume information, identifiers for purchased items, prices, timestamps associated with purchases, and/or the like. In some examples, the system may receive queue information, such as the location of user devices that the merchant detects as being in a queue discussed above.

In some examples, the POS system of the merchant may be communicatively coupled with the system to provide information regarding purchases, queues, number of patrons, and/or the like. In some examples, the system may also be a payment provider and may facilitate the transfer of funds for transactions between the merchant and users. In such cases, the system may receive purchase information as part of the transaction.

In some examples, process 400 may include operation 405. At operation 405, the system may determine wait times based on the information received at operation 403 and/or 404. In some examples, the wait times may be determined based at least in part on sales volumes for a given time period, check out frequencies, and/or historical sales volumes for a given time period. In some examples, the wait time may be determined based at least in part on the number of users the system determines are near the merchant or are within one or more geofences associated with the merchant at operation 403. In some examples, wait times may depend on the number of users that are determined to be in queues to check out. For example, the system may determine wait times based on determined queue lengths for checkout stands and a determined average checkout speed or frequency, which may be determined by how quickly a queue is moving and/or how quickly the merchant is processing purchases. An example wait time and line length determination is discussed in more detail below. In some examples, the system may receive dwell times from user devices or determine dwell times based on time of entry and exit of a geofence received from user devices. The system may use the dwell time to determine how long a trip to the merchant will take and/or a general wait time.

In some examples, process 400 may include operation 406. At operation 406, the system may receive a request about the merchant. The request may come from a merchant, a user, third party server, and/or the like. In some examples, the user may have searched for the merchant on an application and the application may request information about the merchant from the system. In some examples, a user may have used a mapping application to search for a product, service, or merchant, and the mapping application may integrate with the system to provide additional information such as wait times and queue lengths.

In some examples, process 400 may include operation 407. At operation 407, the system may respond to the request at operation 406 with information about the merchant. In some examples, the system may provide, in response, the queue lengths, estimated wait times, number of checkout stands open, and/or other information regarding the status of a merchant. In some examples the system may respond with the wait time determined at operation 405. In some examples, the system may respond with a graphical user interface for display on a user device. The graphical user interface may depict how crowded a merchant is and/or the line lengths at checkout stands. In some examples, the GUI may display a miniature diagram, similar to the one shown in FIG. 3, which may show how many people are at the merchant, how many people are in line at each checkout stand, and/or other information. In some examples, the user device may be a virtual reality, augmented reality, and/or mixed reality device. In such examples, the system may cause the user device to display a virtual/augmented/mixed reality element indicating line lengths, and/or queue times. In some examples, the virtual/augmented/mixed reality element may be configured such that is displays over checkout stands when viewed through the user device. In this manner, the information displayed in the virtual/augmented/mixed reality element would be unobstructed and visible above isles and people.

In some examples, process 400 may include operation 408. At operation 408 the system may implement or suggest one or more wait time reduction operations. For example the system may identify an item being sold by the merchant that is very popular. In response, the system may suggest to the merchant to open a checkout stand dedicated to the item, and the system may then advertise that a dedicated checkout stand for the item was created. The system may also separately track the queue lengths and times for that particular item and providing this information to users in response to requests at operation 406.

In some examples, the system may set up a pre-pay or preorder options that can be dynamically provided to users inquiring about the merchant at operation 406. The system may then be able to handle purchases on behalf of the merchant as if it were an additional checkout stand for that one particular item. A more detailed discussion of an example wait time reduction operation is discussed in more detail below.

Figure 5:
FIG. 5 is a flow diagram illustrating an example process for determining queue lengths.

FIG. 5 illustrates example process 500 for determining queue lengths. In some examples, process 500 may be implemented by a system such as computing environment 100 of FIG. 1, queue reduction system 300 of FIG. 3. According to some embodiments, process 500 may include one or more of operations 501-504, which may be implemented, at least in part, in the form of executable code stored on a non-transitory, tangible, machine readable media that, when run on one or more hardware processors, may cause a system to perform one or more of the operations 501-504.

In some examples, process 500 may include operation 501. At operation 501 the system may receive indicators associated with the location of one or more user devices. In some examples, the indicators may be estimated distances between one or more wireless communicators to the one or more user devices. For example, a wireless communicator of a merchant device (such as wireless communicators 312, 322, and 332 of FIG. 3) may communicate wirelessly with a user device and calculate the distance to the user device based on the signal strength. Distance may be estimated and/or calculated, for example, based on the signal strength and the free-space path loss formula. The free-space path loss formula determines the free-space path loss over a distance based on the frequency of a wireless signal. This equation can be used to calculate distance between devices communicating wirelessly when the free-space path loss and frequency are known. Free-space path loss can be calculated based on the transmission signal strength and received signal strength and any gains and/or losses that are not caused by the free-space path loss. In some examples, the transmission strength may be communicated to the system from the one or more user devices or merchant devices, and the system may calculate the distances between the one or more wireless communicators and the one or more user devices.

In some examples, the system may receive multiple distances associated with a single device, such as the distance between the single device and multiple wireless communicators of a merchant. The wireless communicators may have a static location which the merchant or wireless communicators may have previously provided to the system. In some examples, when the system has at least three distances to a user device each based on a different wireless communicator, the system may triangulate the location of the user device.

In some examples, the system may be able to determine the location with two distances to the user device. Having two distances would allow the system to narrow the location of the device at two points (based on the intersection of two circles using the distance as the radius of the circle and the wireless communicator locations as the center of the circle). Because the two circles will intersect at two points, an additional reference point would be needed to determine the location of the user device. The system can determine the correct location point from the two possibilities based on indications on where the queue line should be as the third reference. For example, the system may have receive a point of reference for determining where a queue line to checkout stands should be located from the merchant. The merchant may provide the system with general location information on where queue lines should be located for a checkout stand, where the exit of the merchant is located, and/or other indicators. Depending on the location of the indicators in relation to the two possible location points for the device, the system may determine the correct location point for the device.

In some examples, the system may determine the correct location of the device based on the location of other devices as a third reference point. For example, other device locations may have been determined using GPS and may form a queue line and the system may determine that the correct location is the location point closest to the other device locations. In some cases, peer-to-peer communication techniques may be used to determine that the device is near these determined other device locations.

In some examples, as explained above, the system may be able to determine the location of the user device based on a single distance to the user device using a directional antenna. The system can determine that the user device is located at the calculated distance from the wireless communicator in the direction of the antenna directionality.

In some examples, process 500 may include operation 502. At operation 502 the location of the devices may be mapped and the system may determine which device location points are associated with the other device location points to form one or more queue lines. For example, the device location points may be clustered using a clustering algorithm, such as k nearest neighbor, to determine which device location points are related to each other and form a queue line. The system may also implement one or more additional algorithms to determine which clusters from the k nearest neighbor results form a line type pattern.

In some examples, the system may also determine the change in position of each device location point over a period of time to determine a directionality vector for each device location point. The directionality vector could also help determine which device location points are associated with a particular queue line from a plurality of queue lines.

Process 500 may also include operation 503. Often times at stores there will be some people shopping and other people waiting in a queue line, and the system will need a way to differentiate between the two. At operation 503, the system may determine which devices are associated with users waiting in a queue and which are not. In some examples, the system may track the movement of device location points, determine their velocity based on the change in distance and the time it takes to move that distance, and filter out the device location points for devices moving above a threshold velocity. In some examples, the system may receive indicators of movement collected by the user devices such as pedometer readings, accelerometer readings, gyroscope readings, and/or the like. The system may use the pedometer reading to determine which devices are waiting in a queue line base on the characteristics of the pedometer readings. For example, the system may determine that pedometer readings indicating steps below a predetermined frequency is associated with someone waiting in a queue. However, sometimes, people are just standing still, and the system may additionally determine if there are multiple user devices nearby that are also have pedometer readings below a predetermined frequency. In this manner the system may be able to determine which devices are associated with users waiting in line fairly accurately using the pedometer readings.

In some examples, the system may determine which user devices are waiting in line by identifying pedometer step readings that have frequencies similar to a determined checkout frequency, such as the checkout frequency determined at operation 405 of FIG. 4, for one or more checkout stands or an average checkout frequency of multiple checkout stands. For examples, the system may determine that the average checkout frequency for checkout stands of a merchant is one checkout every five minutes. The system may then look for pedometer readings from user devices that have five minute intervals between one or more step readings. In some examples, the system may have a predetermined range for the intervals to account for estimation errors, such as anything with 10% or less of the 5 minute interval. It is also contemplated in this disclosure that other motion sensors may be used in a similar manner.

In some examples, the received device location points may serve as indicators that the devices are in a queue line because the application communicating with the system may be configured to filter for devices that are not moving or moving below a threshold velocity, have a certain pedometer characteristic (e.g. below a threshold step frequency), and/or the like. In some examples, the system may provide checkout interval times to the user devices such that the user devices can determine whether the user is waiting in a queue in a similar manner as discussed above with the system. In some examples, the system may use multiple conditions to filter for user devices that are associated with users waiting in a queue. For example, the system may filter for devices that are within a geofence associated with one or more checkout stands in addition to having a particular motion and/or step frequency.

In some examples, correlation between a plurality of devices may be used to determine that devices are within a checkout line as opposed to pausing while browsing. For example, velocity or pedometer information that is received from several devices in the same area and is highly correlated may indicate that the several devices are starting and stopping movement in a coordinated manner as a result of being in the same checkout line.

In some examples, process 500 may include operation 504. At operation 504 the system may determine how many people are in each queue. In some examples, the system may determine how many device location points are in each cluster determined at operation 502. The system may use this number as an approximation of queue lengths. In some examples, the system may be able to determine wait times for each checkout stand based on the queue length and average checkout speeds determined at operation 503. In some examples, this information may be used as part of process 400 of FIG. 4 to provide operation intelligence of a merchant.

In some examples, the system may be able to determine an approximate queue time for a particular user in the queue based on the queue position of the user device and the average checkout speeds. The queue position for a particular user can be determined by the order in which the user devices are place in operation 502 or the number of other user devices determined to be between the user device and checkout stand.

In some examples, the queue lengths and wait times may be archived in a database. The archived wait times and queue lengths may be categorized based on date and time. In this manner, the system may be able to predict future wait times or provide recommendations on the best time to shop at a merchant for the shortest queues. The system may provide user devices with the merchant peak busy times for users to avoid.

Figure 6:
FIG. 6 is a flow diagram illustrating an example process for dynamically identifying and implementing queue reduction actions.

FIG. 6 illustrates example process 600 for dynamically identifying and implementing queue reduction actions. In some examples, process 600 may be implemented by a system such as computing environment 100 of FIG. 1, queue reduction system 300 of FIG. 3. In some examples, process 600 may be implemented by operation 408 of FIG. 4. According to some embodiments, process 600 may include one or more of operations 601-606, which may be implemented, at least in part, in the form of executable code stored on a non-transitory, tangible, machine readable media that, when run on one or more hardware processors, may cause a system to perform one or more of the operations 601-606.

At operation 601, the system may receive transaction data from a merchant. In some examples, the transaction data may be receipts for transaction made at the merchant. The transaction data may also include a time stamp associated with the time of purchase, a list of items purchased, an identifier for the purchaser, purchase number, and/or the like.

At operation 602, the system may monitor a metric indicative of how busy the merchant is. For example, the system may track the purchase rate or how many purchases are being made for a given time for a merchant, the number of people that have come within a geofence associated with the merchant, how long the lines are for checkout, the number of open checkout stands, large increase of people entering the geofence associated with the merchant, and/or the like.

At operation 603, the system may track purchase items to identify a popular item being purchased from the merchant. For example, the system may tally items purchased within a predetermined time frame, and determine that one or more items are disproportionately purchased. For example, a coffee shop may sell many different types of coffee but the system may determine that a majority of purchases is a small latte. The system may use a sorting algorithm, or another algorithm, to determine which items are the most popular.

At operation 604, the system may suggest to the merchant to implement a temporary purchase efficiency. In some examples, the system may make the suggestion in response to determining that the merchant is very busy at operation 602 (e.g. purchase rate above a threshold value, number of users within the geofence associated with the merchant over a threshold value, and/or the like) and/or that an item is disproportionally purchased at operation 603. The system may suggest that the merchant allow for pre-orders through the system or open a lane dedicated to the popular item.

At operation 605, the system may receive, from the merchant, a response to the suggestion. For example, the system may be given authority to conduct and relay pre-orders to the merchant. In some examples, the merchant may provide the system with information about a new lane dedicated to an item for advertisement and reporting.

At operation 606, the system may advertise the efficiency and also implement one or more purchase options using the purchase efficiency in response to additional user inquiries. For example, the system may display predicted wait times and queue sizes generally for the merchant, but also wait times for a particular items, lanes open at the merchant dedicated to the items, and options for pre-ordering the item. In some examples, the system may cause one of the POS devices of a merchant to switch to an efficiency mode and notify a cashier or employee of the change to the POS device. For example, the system may cause a POS to be limited to certain items or a single item. Furthermore, the system may cause a screen associated with the POS or lane for the POS to indicate that the lane is dedicated to certain items or a single item. In some examples, the system may cause user devices, such as a smartphone, or augmented reality device to provide notification that the lane is dedicated to a single item. For example, if a user were to be wearing an mixed/augmented reality goggles/glasses as a user device, the system may causes the user device to advertise that a particular lane was dedicated to a particular item or items.

In some examples, the POS system may turn off certain functionalities to increase efficiency, for example, the system may reduce options of purchase items on the cashier/POS to the limited certain items or a single item. In some examples, such as when the lane is dedicated to a single item, the POS device may be limited to entering the number of the single item that is being purchased. Furthermore, the system device may reduce the requirements with regards to purchase authentications. Normally, a system may wait for payment to be remunerated or authorization to be provided before allowing for another purchase. In some examples, the system, for the sake of efficiency, may allow for purchases to buffer and conduct new purchases even if payment or authorization for the previous purchase has not been received. In this manner, the merchant may accept the risk of additional fraudulent purchases and the associated losses and make up the losses through increased purchase volume received through the quicker checkout process.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A user device, comprising:
a non-transitory memory storing instructions; and
one or more hardware processors coupled to the non-transitory memory and configured to read the instructions from the non-transitory memory to cause the user device to perform operations comprising:
determining that the user device is within a geofence;
determining that the user device has a movement frequency below a threshold movement frequency;
communicatively coupling with a wireless communicator;
determining a distance between the user device and the wireless communicator using a signal strength of a signal received from the wireless communicator;
determining that the user device is in a checkout line queue within the geofence using the distance and cluster information associated with a plurality of additional user devices within the geofence, wherein the cluster information comprises device locations for the plurality of additional user devices within the geofence and available checkout processing within the geofence;
communicating the determination that the user device is in the checkout line queue to a service provider;
receiving a queue time associated with the checkout line queue from the service provider, wherein the queue time is determined based at least on the distance;
in response to processing a transaction with a point of sale system within the geofence, detecting when the user device exits the geofence; and
receiving, from the service provider, an updated queue time for the checkout line queue with the service provider, the updated queue time determined based on a dwell time for the user device within the geofence based on when the user device enters and exits the geofence.

2. The user device of claim 1, wherein the operations further comprise:
decoupling from the wireless communicator in response to the user device leaving the geofence or determining that the movement frequency is above the threshold movement frequency.

3. The user device of claim 1, wherein the operations further comprise:
communicating information indicative of a location of the user device to the wireless communicator.

4. The user device of claim 1, wherein the movement frequency is a step frequency determined by readings from at least an accelerometer of the user device.

5. The user device of claim 1, wherein communicatively coupling with the wireless communicator comprises broadcasting a wireless signal.

6. The user device of claim 1, wherein communicatively coupling with the wireless communicator comprises searching for a broadcasted wireless signal.

7. A method comprising:
determining that a user device is within a geofence;
determining that the user device has a movement frequency below a threshold movement frequency;
causing the user device to broadcast information wirelessly;
determining, by the user device, a distance between the user device and a wireless communicator within the geofence using a signal strength of a signal received from the wireless communicator;
determining that the user device is in a checkout line queue within the geofence using the distance and cluster information associated with a plurality of additional user devices within the geofence, wherein the cluster information comprises device locations for the plurality of additional user devices within the geofence and available checkout processing within the geofence;
communicating the determination that the user device is in the checkout line queue to a service provider;
receiving a queue time associated with the checkout line queue from the service provider, wherein the queue time is determined based at least on the distance;
in response to processing a transaction with a point of sale system within the geofence, detecting when the user device exits the geofence; and
receiving, from the service provider, an updated queue time for the checkout line queue with the service provider, the updated queue time determined based on a dwell time for the user device within the geofence based on when the user device enters and exits the geofence.

8. The method of claim 7, further comprising:
causing the user device to stop broadcasting the information wirelessly in response to determining that the user device is outside the geofence or that the movement frequency is above the threshold movement frequency.

9. The method of claim 7, wherein the information comprises location information of the user device.

10. The method of claim 9, wherein the information comprises a device identifier.

11. The method of claim 7, wherein the movement frequency is determined from accelerometer readings.

12. The method of claim 9, wherein the location information is GPS information associated with the user device.

13. The method of claim 7, wherein the information comprises information for communicatively coupling with the user device.

14. A non-transitory machine readable medium having stored thereon machine readable instructions executable to cause a machine to perform operations comprising:
determining when a user device enters a geofence;
determining that the user device has a movement frequency below a threshold movement frequency;
causing the user device to listen for wireless communications;
determining, by the user device, a distance between the user device and a wireless communicator within the geofence using a signal strength of a signal received from the wireless communicator;
determining that the user device is in a checkout line queue within the geofence using the distance and cluster information associated with a plurality of additional user devices within the geofence, wherein the cluster information comprises device locations for the plurality of additional user devices within the geofence and available checkout processing within the geofence;
communicating the determination that the user device is in the checkout line queue to a service provider; and
receiving a queue time associated with the checkout line queue from the service provider, wherein the queue time is determined based at least on the distance;
in response to processing a transaction with a point of sale system within the geofence, detecting when the user device exits the geofence; and
receiving, from the service provider, an updated queue time for the checkout line queue with the service provider, the updated queue time determined based on a dwell time for the user device within the geofence based on when the user device enters and exits the geofence.

15. The non-transitory machine readable medium of claim 14, wherein the operations further comprise:
   causing the user device to stop listening for wireless communications in response to at least one of the detecting when the user device exits the geofence or that the movement frequency is above the threshold movement frequency.

16. The non-transitory machine readable medium of claim 14, wherein the operations further comprise:
   receiving the wireless communications from the wireless communicator.

17. The non-transitory machine readable medium of claim 16, wherein the operations further comprise:
   relaying the wireless communications from the wireless communicator to a remote server.

18. The non-transitory machine readable medium of claim 17, wherein the operations further comprise:
   communicating an identifier of the user device to the remote server.

19. The non-transitory machine readable medium of claim 18, wherein the queue time is determined by the remote server.

20. The user device of claim 1, wherein the service provider determines a plurality of checkout line queues within the geofence based on a plurality of point of sale devices within the geofence and the cluster information for the plurality of additional user devices within the geofence, and wherein the operations further comprise:
   identifying, with the service provider, that the user device is located at the checkout line queue based on the plurality of checkout line queues and at least one of the distance between the user device and the wireless communicator or a location of the user device,
   wherein the determining that the user device is within the checkout line queue is further based on the identifying.

* * * * *